May 18, 1954     C. A. ELLIS     2,678,585
OPHTHALMIC MOUNTING
Filed Dec. 30, 1949
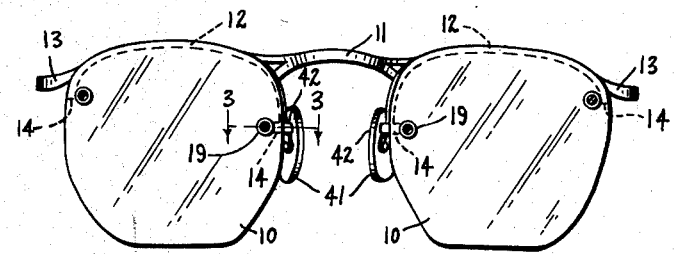
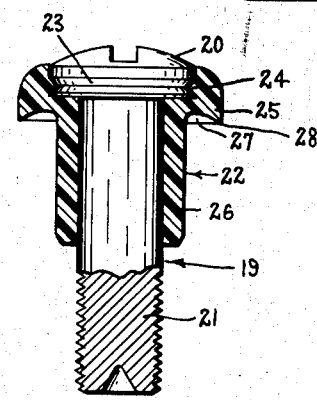
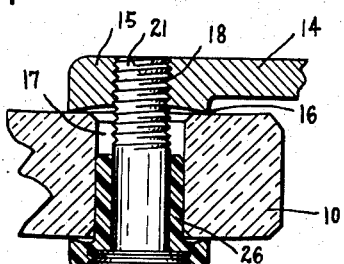
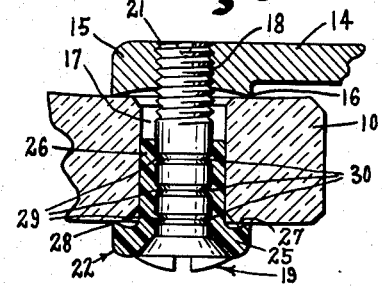
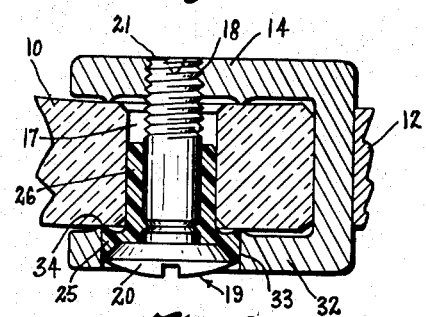
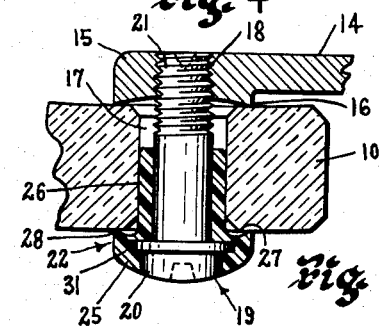
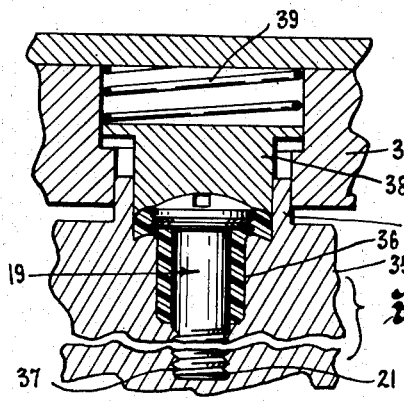
INVENTOR
CHARLES A. ELLIS
BY
*Louis L. Vagnon*
ATTORNEY Patented May 18, 1954

2,678,585

UNITED STATES PATENT OFFICE 2,678,585

OPHTHALMIC MOUNTING

Charles A. Ellis, Southbridge, Mass., assignor to American Optical Company, Southbridge, Mass., a voluntary association of Massachusetts Application December 30, 1949, Serial No. 135,971

4 Claims. (Cl. 88—47)

This invention relates to ophthalmic mountings and has particular reference to improvements in connecting means for securing the lenses of ophthalmic mountings to the supporting structure therefor, and method of making same.

One of the principal objects of this invention is to provide an ophthalmic mounting having improved means for connecting the lenses to the supporting structure thereof and embodying screw means having a resilient bushing permanently attached thereto, which bushing is adapted to be inserted with the screw within an opening in a lens and to absorb shocks or strains to which the lens might be subjected thereby preventing possible breakage of the lens.

Another object is to provide connecting means of the above character wherein the screw means is provided with one or more peripheral grooves and the resilient bushing is provided with one or more ring-like portions disposed within said groove or grooves whereby the bushing will become permanently attached to the screw but will permit the screw to be rotated therewithin.

Another object is to provide connection means of the above character wherein the head portion of the screw means is provided with an overall diameter greater than the diameter of the opening in the lens whereby when the screw and bushing is inserted in the lens opening and the end portion of the screw threaded into a lens strap, the screw head will cause the material of the resilient bushing to be compressed and to thereby firmly engage the surface of the lens adjacent the opening therein.

Another object is to provide a device of the above character embodying permanently connected screw and bushing means which because of their permanent connection results in the decreasing of the number of the loose, easily lost parts thereby constituting a great economy and fiscal saving and decreasing the time required for assembling a lens to a supporting structure.

Other objects and advantages of the invention will become apparent from the following description taken in connection with the accompanying drawing, in which:

Fig. 1 is a front elevational view of an ophthalmic mounting embodying the invention;

Fig. 2 is a side elevation partly in section of a screw formed in accordance with the invention;

Fig. 3 is a fragmentary sectional view taken on line 3—3 of Fig. 1 illustrating the method of connecting a lens to a lens strap;

Figs. 4 and 5 are views similar to Fig. 3 showing modifications in the screw means;

Fig. 6 is a fragmentary sectional view illustrating a lens connected to a double strap supporting means and Fig. 7 is a sectional side view illustrating the preferred method of molding a bushing onto a screw.

In the manufacture of ophthalmic mountings particularly of the rimless or semi-rimless type the lenses are connected to the supporting frame by means of screws which are adapted to extend through openings in the lenses from one side thereof and to be threaded into lens straps disposed adjacent the opposed lens surface. The straps may also be provided with spaced portions disposed on the opposite sides of the lens if desired with the screw extending through the lens opening and connecting the two spaced portions. However, in connecting lenses to the supporting structure in this manner, it has been found that many times the openings in the lens and lens straps are not aligned and the resultant connection will then be unsatisfactory due to the fact that the screws may be loosely disposed in one of the openings, consequently causing play and insecure joining of the lens to the strap or straps. This necessitates frequent adjustment and tightening of the screws.

In addition to this undesirable feature it has also been found that in connecting a lens to a strap the stress applied to the screw when threading it into a lens strap may be transferred directly to the lens and cause possible resultant damage thereto. To overcome this objectionable feature bushings and washers of resilient material have been used as buffer means between the lenses and straps to absorb strains and prevent breakage of the lens, as well as to provide a firm gripping means upon the parts to prevent undue loosening during use. However, these bushings and washers have generally been formed as separate disconnected parts and due principally to their necessarily small sizes are easily misplaced or lost and difficult to manufacture.

The present invention overcomes the foregoing and other objectionable features by providing a screw for connecting a lens to a lens strap, which screw carries a substantially irremovable resilient one-piece bushing and washer member as a part thereof, the screw having irregular characteristics whereby when the resilient member is molded or otherwise attached thereto it will be provided with a portion assuming the shape of said irregularities and thereby become irremovably attached to the screw. With this construction a lens, upon being connected to a supporting structure therefor, will not be subject to undue strain upon tightening of the screws, and due to the fact that there is a decrease in the number of small hard to handle and easily lost parts this results in a considerable saving to manufacturers and opticians as well as to the eventual owners and wearers.

Referring more particularly to the drawing wherein like characters of reference designate like parts throughout the several views, the invention is shown as applied to an opthalmic mounting embodying a pair of spaced lenses 10 which are connected to and supported by a supporting structure comprising a bridge member 11 having connected to each end thereof an elongated lens supporting arm 12, the lens supporting arms 12 being spaced slightly rearwardly of the respective lenses and shaped to follow substantially the upper contour shape thereof. Adjacent the outer end of each lens supporting arm 12 is fixedly attached a temple supporting end piece 13 which is shaped to extend outwardly and rearwardly of the device and to which a respective temple member (not shown) is adapted to be hingedly connected. The ends of the lens supporting arms 12 terminate in the temporal and nasal regions of the lenses and are provided with strap portions 14 which extend inwardly of the lenses and are adapted to engage the rear surfaces thereof.

Each of the lens straps 14 are shaped with an end portion 15 (Fig. 3) having a concave surface on the side directed toward the lens which forms a substantially annular bearing portion 16 which engages the lens in encircling relation with respect to a bore 17 which extends through the lens and which is preferably substantially concentric with a threaded bore 18 in the lens strap end portion 15.

A screw 19 is used to connect a lens 10 to a lens strap 14 and is provided with the conventional head portion 20 and shank 21, the shank 21 being at least partially threaded to engage with the threads of the bore 18 in the lens strap 14. The screw 19, in accordance with this invention, is provided with a resilient one-piece bushing and washer member 22, which member 22 is substantially irremovably connected to the screw 19, preferably as shown in Fig. 2. In this embodiment of the invention the screw head portion 20 is provided with a peripheral groove 23 whereby when the resilient member 22 is molded or otherwise attached to the screw 19 it will be provided with an internal peripheral ridge portion 24 which is shaped to be positioned within the groove 23 and thereby retain the member 22 constantly in located position on the screw 19.

The resilient member 22 is formed of a plastic or like synthetic material, preferably a polyamide resin known as nylon or a similar plastic such as polytetrafluoroethylene or phenol-formaldehyde compound. Also suitable are materials such as silicone rubber or synthetic rubber such as GRS. Such a material has little cold flow characteristics, resilience, is inert to metal, less hard than metal, and is not easily attacked by weather.

When forming a resilient member 22, the member is provided with a peripheral annular portion 25 encircling the head portion 20 of the screw 19 and with an integral bushing portion 26 which is shaped to concentrically overlie a portion of the shank 21 of the screw. The bushing portion 26 is preferably of a size and shape to fit within the bore 17 of the lens 10, and the annular portion 25 is of such diameter that it will overlie one end of the bore 17 between the bore and the screw head portion 20 in the manner of a washer. The surface of the annular portion 25 in engagement with the lens 10 is hollowed out as at 27 which thus forms an outer peripheral ring-like engagement portion 28 bearing upon the lens surface. Thus it will be seen that upon insertion of a screw 19 and attached resilient member 22 into a bore 17 in a lens 10 and upon subsequent threading of the threaded portion of the screw shank 21 into the lens strap 14, the ring-like bearing portion 28 will first engage the adjacent lens surface, and upon continued tightening of the screw the annular hollowed portion 27 will tend to flatten out and thus provide a greater surface bearing upon and gripping the lens. Many advantages are provided with this particular shape of the annular portion 25. The initial pressure upon the lens is applied away from the edge of the drilled hole 17 and because of the concavity of the annular portion 25 is a purely compressive force with minimum danger of causing lens breakage. Also the concave shape of the annular portion 25 enhances the natural resilience of the material, producing the effect of a device known as a Belleville spring.

It will be seen that as the member 22 more firmly engages a lens it may, due to frictional engagement with the lens, become substantially stationary. In such a case the screw 19 can be rotated within the member 22 due to the particular construction described. If necessary the screws can be dipped in a parting solvent for causing the plastic material to break its adherence to the metal.

With this type of construction it is evident that due to the inherent characteristics of the resilient material forming the member 22 most of the strains and stresses to which a lens or lens strap may be subjected will be at least partially absorbed by the member 22, thereby relieving the lens 10 and preventing possible damage or breakage thereto.

Although the screw 19 has been described as having a groove 23 provided in its head portion 20 in which an internal ridge portion 24 of the bushing 22 is adapted to be located, it is to be understood that these parts may be constructed as shown in Fig. 4 wherein the shank portion 21 of the screw is provided with a plurality of grooves 29 similar to the groove 23 and the bushing portion 26 of the resilient member 22 provided with a similar number of internal ridges 30 positioned within the grooves 29. Such a construction is equally efficient as the construction shown in Fig. 2.

Still another satisfactory method of connecting the resilient member 22 to the screw 19 and permitting the screw 19 to rotate within the member 22 is shown in Fig. 5. In this construction the head portion 20 of the screw is provided with a peripheral flange 31 thereon which is adapted to be positioned within a groove formed in the washer like portion 25 of the resilient member 22.

In each of these constructions however, it is believed advisable to provide a screw head portion 20 of a diameter larger than the diameter of the bore 17 of the lens 10. Thus when tightening a screw into a lens strap the head portion 20 will thus cause the portion of the resilient member 22 to be firmly clamped between the head portion and the lens and there will be no tendency for the screw head to be forced inwardly of the bore 17.

When forming a double ear lens strap connection the combined screw 19 and member 22 of resilient material may be formed as described above. However, the lens strap ear 32 adjacent the head portion 20 of the screw will be provided with an enlarged opening 33 therethrough substantially concentric with the lens bore 17 and threaded opening 18 in the opposed lens strap ear 14. The opening 33 will preferably be of a diameter substantially equal to the diameter of the screw head portion 20 so that as the screw is threaded into the lens strap 14 the inner surface of the screw head 20 will tend to urge the resilient material of the annular washer like portion 25 toward the inner walls of the bore 33. This will cause the material to firmly, frictionally engage the lens strap 32. The inner surface of the strap ear 32 is preferably provided adjacent the bore 33 with a ring-like bearing portion 34 which is in engagement with the adjacent lens surface and which therefore will prevent any excess amount of resilient material of the member 22 from being forced between the strap ear 32 and lens 10 rather than into engagement with the strap thus providing a firmer and more secure connection.

An ophthalmic mounting of this type and of which the presently described invention forms a part will also be provided with the usual nose pads 41 which can be supported in any suitable manner such as by attaching them to nose pads supporting structure such as by soldering or otherwise fixedly attaching them to the inner ends of lens supporting arms 12.

It is to be understood that the resilient member 22 may be formed and attached to the screw 19 in any suitable manner. One satisfactory method of performing this operation is diagrammatically illustrated in Fig. 7 wherein there are shown upper and lower mold halves 34 and 35 respectively. The lower mold half 35 is provided with an internal hollow portion 36 shaped substantially to the shape desired of the resultant resilient member 22 and has a threaded recess 37 disposed in communication with the lower end of the hollowed-out portion 36. The screw 19 which is to be provided with a resilient member 22 and which has a groove 23 or similar means formed thereon for securement of the member 22 is positioned in the hollowed-out portion 36 and threaded into the recess 37 having first been treated, if desired, with a parting agent such as a silicone fluid. The upper mold half 34 is provided with a die 38 which is resiliently urged toward the screw 19 by a spring 39 or similar means, the die 38 being shaped to substantially the shape of the head of the screw and the adjacent upper end of the member 22. The lower mold half 35 is provided with an upwardly extended annular portion 40 which is adapted to encircle the die 38 and to act as guide means in which the die may reciprocate as well as to act as side walls for controlling the diameter of the resultant washer like portion 25 of the member 22. When the molded halves are assembled and located in the related positions shown in Fig. 7 the selected material for forming the resilient member 22 can be ejected into a cavity formed by the hollowed-out portion 36 and thus forming a resilient member 22 having the size and shape desired.

It is of course to be understood that other means and methods can be provided for forming the resilient member 22 and attaching it to the screw 19.

From the foregoing it will be seen that all of the objects and advantages of the invention have been accomplished by providing lens connection means embodying a screw having a resilient bushing permanently attached thereto, which bushing is adapted to be inserted with the screw within an opening in a lens to absorb shocks or strains to which the lens might be subjected for preventing possible breakage thereof.

While the novel features of the invention have been described and are pointed out in the annexed claims, it will be understood that many changes may be made in the details of construction shown and described without departing from the spirit of the invention. I, therefore, do not wish to be limited to the exact details shown and described as the preferred only are set forth by way of illustration.

I claim:

1. In a lens supporting structure of the character described, a pair of spaced ears for connection with the opposed sides of an apertured lens, one of said ear portions having an opening therein of a controlled size greater than that of the lens aperture, an annular-like portion of resilient nature shaped to fit within said opening of the ear and having a side wall to loosely engage the wall in the opening of said ear and a central opening in substantial alignment with the lens aperture, and a metallic connection member having an enlarged head of a size to fit within said ear opening and overlying the annular-like resilient portion, said connection member having a shank portion extending through the aligned opening in said resilient portion and aperture of the lens for connection with the opposed ear, and said resilient annular-like portion having its side directed toward the lens of substantially cup-shape whereby adjustment of the head portion of the metallic connection member toward the lens will tend to flatten the cup-shaped side of said resilient annular-like portion and urge said sidewall of the resilient annular-like portion into intimate resilient bearing relation with the wall of the opening in the said ears so as to maintain a binding engagement therewith and said ears in connected relation with the lens.

2. In a lens supporting structure of the character described, a pair of spaced ears for connection with the opposed sides of an apertured lens, one of said ear portions having an opening therein of a controlled size greater than that of the lens aperture, an annular-like portion of resilient nature shaped to fit within said opening of the ear and having a side wall to loosely engage the wall of the opening in said ear and a central opening in substantial alignment with the lens aperture, said annular-like portion having a recess in its outer surface and a metallic connection member with an enlarged head of a size to fit within said recess, said recess and enlarged head having inwardly converging side walls, said connection member having a shank portion extending through the aligned opening in said resilient portion and aperture of the lens for connection with the opposed ear, and said resilient annular-like portion having its side directed toward the lens of substantially cup-shape whereby adjustment of the head portion of the metallic connection member inwardly toward the lens will tend to temporarily flatten said cup-shaped side of the resilient annular-like portion and urge the peripheral side wall of the resilient portion into intimate binding relation with the wall of the opening in the said ear so as to maintain said ears in connected relation with the lens.

3. In a lens supporting structure of the character described for lenses having a connection opening adjacent the edge thereof, a lens strap having a threaded opening and adapted to overlie a side surface of a lens and with said threaded opening aligned with the connection opening in the lens, a metal screw having an enlarged head to be positioned adjacent the opposed side of the lens and having a shank to be extended through said opening formed in said lens when in position of use, said shank terminating in a threaded end portion for connection within the threaded opening in said lens strap, a bushing formed of resilient substantially non-elastic plastic material and embodying a tubular portion fitting about the shank of said screw so as to lie between said shank and the wall of said lens opening, the external diameter of said tubular portion nearly equalling the external diameter of the head of the screw, and an outwardly flared portion adjacent the upper end of said tubular portion, said outwardly flared portion being recessed on its outer side to receive the head of the screw and having a cup-shaped surface on its opposed side for engagement with the surface of the lens about the opening therein, the extent of said flared portion only slightly exceeding the thickness of said tubular portion whereby said flared portion will be substantially shape retaining though yieldable by reason of its resilient nature upon movement of the shank of the screw inwardly of the lens opening to threadedly connect its end to the strap, and said screw and bushing having interconnection means including an encircling channel formed on one and a ridge formed on the other so as to maintain the bushing in assembled relation with the screw.

4. In a lens supporting structure of the character described for lenses having a connection opening adjacent the edge thereof, a lens strap having a threaded opening and adapted to overlie a side surface of a lens and with said threaded opening substantially aligned with the connection opening in the lens, a metal screw having an enlarged head to be positioned adjacent the opposed side of the lens and having a shank to be extended through said opening formed in said lens when in position of use, said shank terminating in a threaded end portion for connection within the threaded opening of the lens strap, and a bushing formed of resilient substantially non-elastic plastic material rotatably secured to said screw including a tubular portion fitting about the shank of said screw so as to lie between said shank and the wall of said lens opening, the external diameter of said tubular portion nearly equalling the external diameter of the head of the screw, and said bushing having an outwardly flared portion adjacent the upper end of the tubular portion recessed on its outer side to receive the head of the screw and having a cup-shaped surface on its opposed side for engagement with the surface of the lens about the opening therein, the extent of said flared portion only slightly exceeding the thickness of said tubular portion whereby the flared portion will be substantially shape retaining though yieldable by reason of its resilient nature upon movement of the shank of the screw inwardly of the lens openings to threadedly connect its end to the strap so as to obtain a firm non-loosening connection of the lens with its supporting structure.

References Cited in the file of this patent

UNITED STATES PATENTS

| Number | Name | Date |
| --- | --- | --- |
| 843,531 | Harper | Feb. 5, 1907 |
| 958,485 | Fay | May 17, 1910 |
| 1,115,700 | Lowres | Nov. 3, 1914 |
| 1,674,258 | Obergfell et al. | June 19, 1928 |
| 2,058,025 | Lowres | Oct. 20, 1936 |
| 2,086,086 | Lassonde | July 6, 1937 |
| 2,105,420 | Hunkeler | Jan. 11, 1938 |
| 2,275,315 | Ray | Mar. 3, 1942 |
| 2,362,726 | Slotsky | Nov. 14, 1944 |

FOREIGN PATENTS

| Number | Country | Date |
| --- | --- | --- |
| 1,315 | Great Britain | of 1901 |
| 736,546 | France | Sept. 19, 1932 |
| 391,668 | Great Britain | May 4, 1933 |
| 110,083 | Australia | Mar. 12, 1940 |